United States Patent [19]
Chenowth

[11] Patent Number: 5,882,062
[45] Date of Patent: Mar. 16, 1999

[54] LOAD CLIMBING CONTAINER COVER SYSTEM

[76] Inventor: Lynn Chenowth, 1404 N. Marshall Ave., El Cajon, Calif. 92010

[21] Appl. No.: 32,880

[22] Filed: Mar. 2, 1998

[51] Int. Cl.⁶ .................................................. B60P 7/04
[52] U.S. Cl. .................................. 296/98; 296/100.11
[58] Field of Search ............................ 296/98, 100.11, 296/100.12, 100.15, 100.16; 52/3; 160/265, 266, 267.1, 268.1

[56] References Cited

U.S. PATENT DOCUMENTS

| | | | |
|---|---|---|---|
| 4,762,160 | 8/1988 | Bechtold et al. | 160/265 |
| 5,125,713 | 6/1992 | Willingham et al. | 296/98 |
| 5,697,663 | 12/1997 | Chenowth | 296/98 |

Primary Examiner—Dennis H. Pedder
Attorney, Agent, or Firm—Frank D. Gilliam

[57] ABSTRACT

A cover system for covering an open topped compartment, such as a truck trailer, that may contain a quantity of particulate material extending in a heap above the sides of the compartment. A sheet of flexible material is rolled at one compartment end for pulling across and covering the compartment. A transverse tube is secured to the cover leading edge. A roller assembly is mounted by brackets to the tube so that as the cover is moved over the heap of material the roller will engage the heap and rotate so that the brackets raise the leading edge above the roller, which rides along the heap. The cover is then fastened in the covering position. When the cover is retracted to uncover the compartment, the roller trails behind the leading edge, permitting the cover to be rolled up easily.

8 Claims, 3 Drawing Sheets

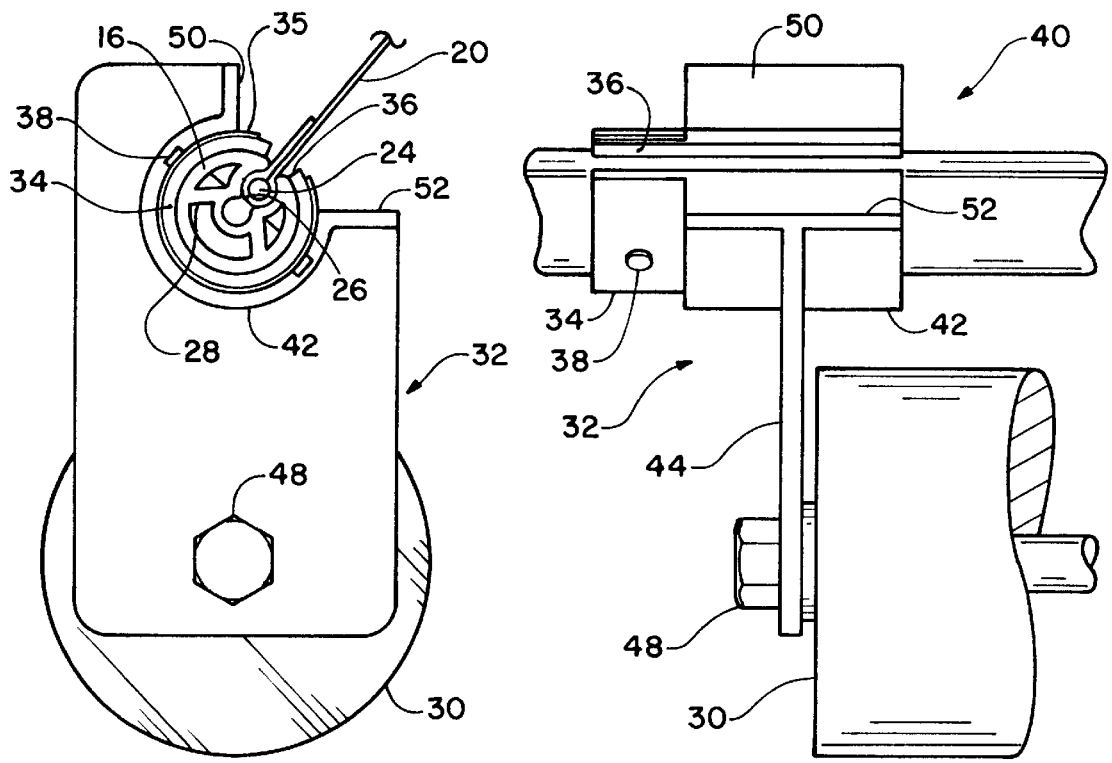
FIGURE 4
FIGURE 5
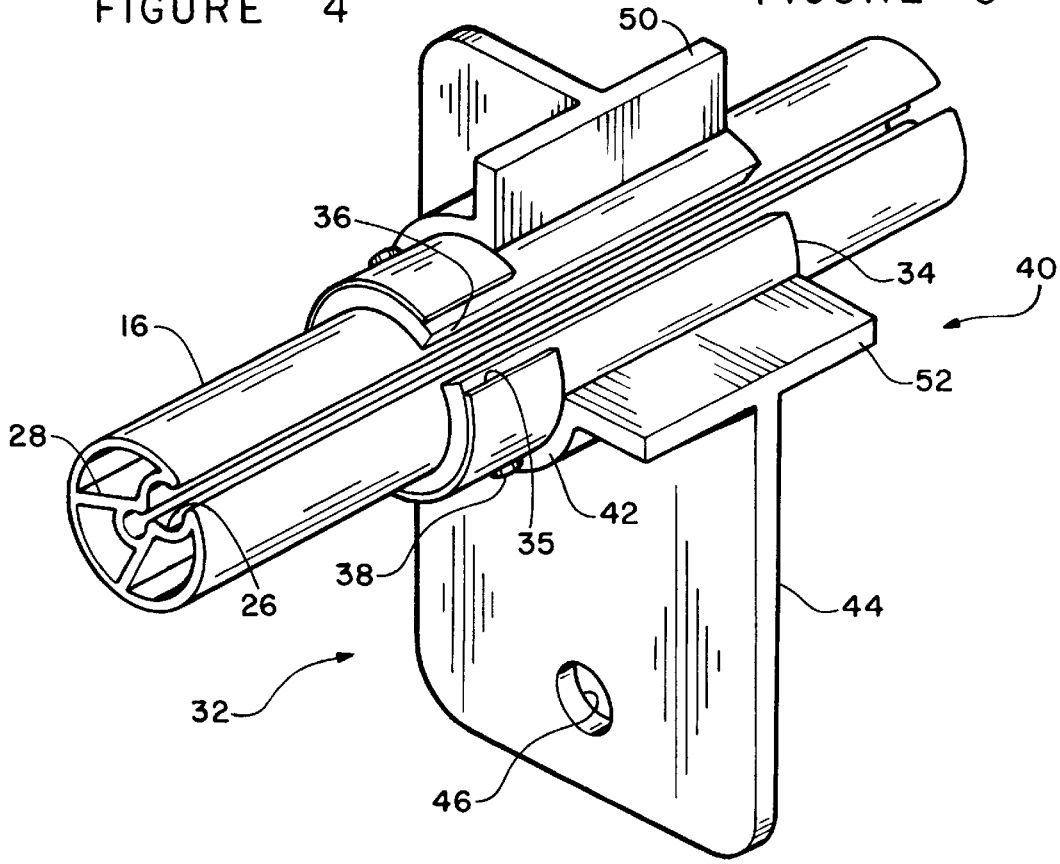
FIGURE 6

LOAD CLIMBING CONTAINER COVER SYSTEM

FIELD OF THE INVENTION

This invention relates in general to covers for large open topped compartments and, more specifically to a system for installing a cover over a container where the contents extend in a loose heap above the container.

BACKGROUND OF THE INVENTION

Open topped compartments, such as truck trailers, dump trucks, storage bins and the like used for hauling or storing particulate material such as grain, ash, lime or the like are subject to having the material fall or blow out onto the roadway. Exposure to rain, excessive sunlight, etc., is often damaging to materials being hauled or stored. With materials such as gravel, aggregate or similar materials, having portions of a load fall onto a roadway is undesirable both from the point of view of littering and the danger of the material striking a following vehicle, possibly breaking a windshield or causing an accident. Where heated materials, such as asphalt, are being stored or carried, retention of heat within the container is very desirable.

Many localities now have laws requiring that all open topped vehicle compartments be covered when containing loose or lightweight material. Often, the loads are simply covered with a tarpaulin that is tied to the edges of the open top at intervals around the opening. While sometimes effective, such tarpaulins are difficult for one person to put into place, especially in windy conditions. Often, it is necessary for the operator to climb on the vehicle or bin sides or across the load to secure the tarpaulin, at considerable personal danger. Installation is time consuming and must be carefully done to prevent an edge of the cover from loosening, allowing spillage of part of the load.

Attempts have been made to provide more convenient covers that are rolled or folded at one end of the compartment and can be unrolled or unfolded to cover the load. These arrangements are generally difficult to deploy and do not adequately secure the sides of the cover to the container sides.

Where a container is filled or overfilled with a granular material, such as dirt or gravel, to the point where the material extends above the container walls, moving a cover over the container surface, typically along and generally parallel with the container upper wall edges, is difficult. The cover edge moving along the container edges tends to dig into the material. Forcing the cover edge through the material is difficult, often impossible for a single operator. In addition, some of the material may be spilled or end up on top of the cover, defeating the purpose of the cover, since spilled or loose material on the cover will fall to the roadway, endangering other vehicles and violating laws and regulations governing covered loads.

Thus, there is a continuing need for improvements in deployable covers for open topped compartments and systems for installing them that will fully and uniformly restrain material loaded in the compartment along both the ends and sides of the compartment, can be easily moved into and out of the covering position by one person standing on the ground, will fully cover material that extends above the compartment sides and will avoid forcing heaped material over the compartment side or onto the cover upper surface from which it can fall to the roadway.

SUMMARY OF THE INVENTION

The above-noted problems, and others, are overcome in accordance with this invention by a cover system for generally rectangular open topped compartments which basically comprises a is flexible cover sheet sized to cover at least the top of an open top, mechanisms for moving the cover sheet from a rolled up, stored position at one end of the compartment with the top of the compartment open and uncovered to a deployed position covering the open top. Since the material in the compartment often extends in a heap extending upwardly above the compartment side walls, a heap climbing means is provided for causing the leading edge of the cover to move up and over any such material heaped above the top edges of the container.

The cover sheet has first and second ends and opposed sides. A tubular roller at a first end of the open top is secured to the first end of said cover sheet and is adapted to having the cover sheet wrapped therearound. A transverse rod is secured to portions of the second end of said cover sheet adjacent to the opposed sides of the cover sheet, leaving a central sheet portion or portions unattached to said rod. A deployment means is secured to the center of the rod for unrolling the cover sheet. A guide means is provided on the transverse rod adjacent to the deployment means so that as said cover is pulled over heaps of granular material in the compartment that extend upwardly above the plane of the top, the guide will move the transverse rod and cover leading edge up and over the material, carrying said cover sheet edge above the material and preventing the rod and leading sheet edge from digging into the material.

The guide is a larger diameter roller or rollers offset from the transverse rod by brackets pivotally mounted so as the transverse rod is pulled toward the second or back end of the compartment as the cover is deployed, the roller extends downwardly toward the compartment at approximately 90° to the heaped up load, so that the roller rides up over the heap while holding the transverse rod and leading edge above the load. When the cover is moved to the storage position, rolled up at the first end of the compartment to open the compartment top, the roller pivots to a trailing relationship to the transverse rod and loosely follows the transverse rod.

For best results, the roller or rollers have a total width equal to from about 30 to 70 percent of the container top width.

A transverse rod end guide means is preferably provided at each end of the rod for guiding the rod along the container edges during movement of the rod and cover between stored and deployed positions.

BRIEF DESCRIPTION OF THE DRAWING

Details of the invention, and of preferred embodiments thereof, will be further understood upon reference to the drawing, wherein:

FIG. 4 is an end elevation view of the assembly of roller, transverse rod and bracket;

FIG. 5 is a detail side elevation view showing the roller to transverse rod bracket;

FIG. 6 is a perspective view of the bracket and transverse rod assembly;

DETAILED DESCRIPTION OF PREFERRED EMBODIMENTS

Figure 1:
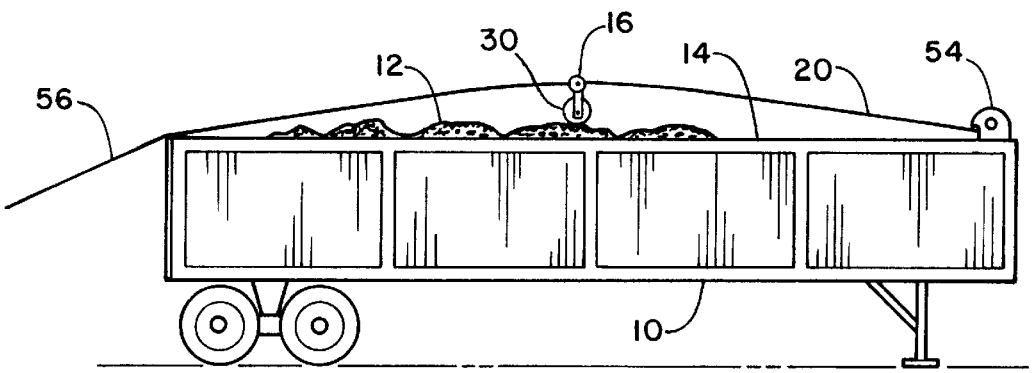
FIG. 1 is a schematic side elevation view of a truck trailer showing the cover installation assembly of this invention moving toward the deployed position.
Figure 2:
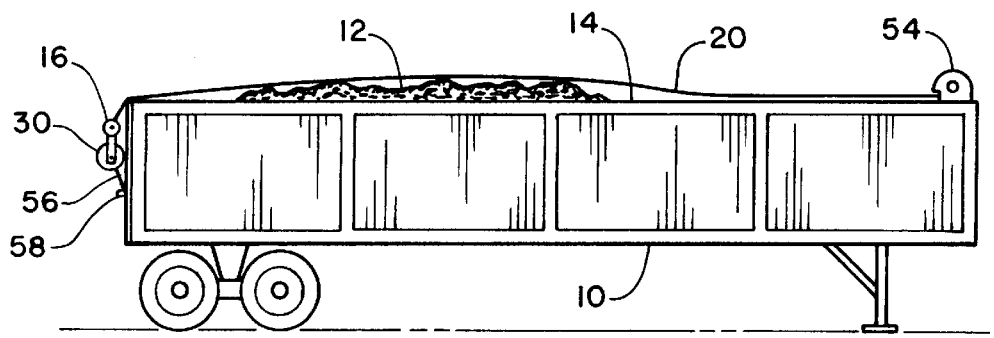
FIG. 2 is a schematic side elevation view of a truck trailer showing the cover installation assembly of this invention moving in the fully deployed position.

Referring to FIGS. 1 and 2, there is seen a conventional truck trailer 10 of the sort used to haul asphalt, gravel, sand, grain, etc. Often, material 12 is heaped up in the trailer compartment higher than the side edges 14. When a conventional cover is slid across the top of the compartment from a storage roller, the leading edge of the cover will dig into heap 12, possibly stopping cover movement and resulting in material piling on top of the cover, where it can fall to the roadway during trailer movement.

Therefore, it is highly desirable to provide an arrangement through which the leading edge of the cover will ride up and over heap 12 as the cover moves from the storage roller to the compartment opposite end.

Figure 3:
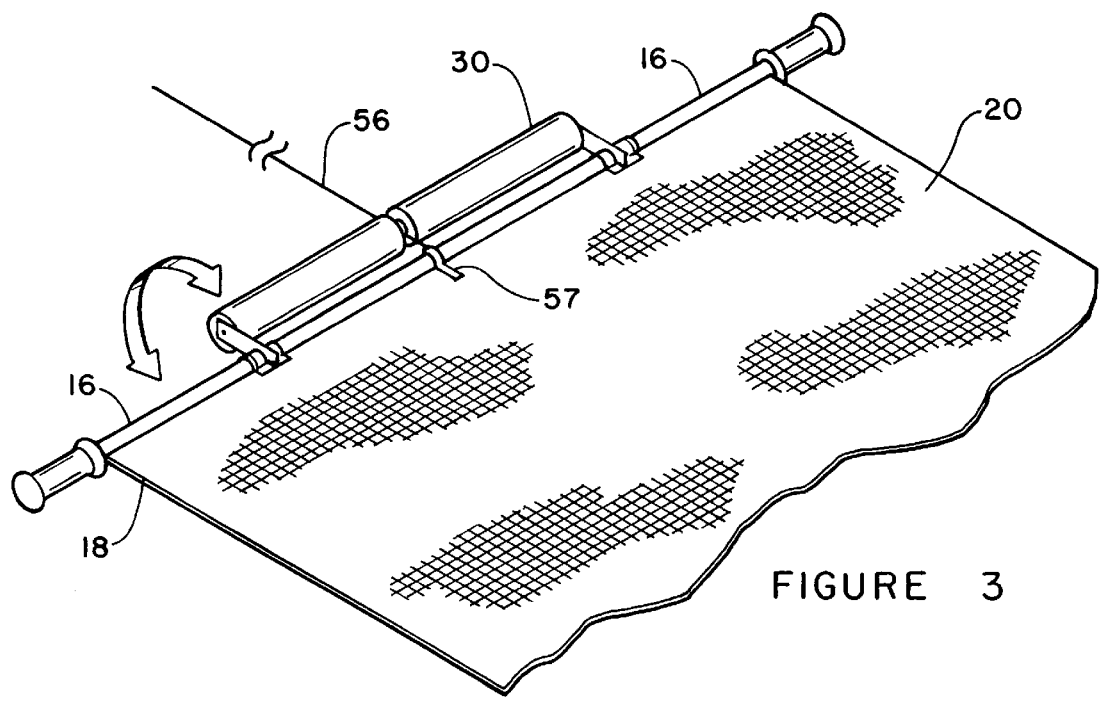
FIG. 3 is a perspective view of a cover leading edge sub-assembly with a wide cylindrical roller guide means in the trailing or moving to storage position.

The over all heap tracking system of this invention is illustrated in FIGS. 1–3. A transverse rod 16 is secured to the leading edge 18 of cover 20. Preferably, cover edge 18 is sewn around a transverse bead 24, typically a flexible plastic rod. Transverse rod 16 has a lengthwise channel 26 sized such that cover leading edge 18 with bead 24 can be slipped in from one end of rod 16 and will be securely held in place. While channel 26 can be formed in transverse rod 16 in any suitable manner, such as milling, preferably the rod is manufactured from aluminum by extrusion to form channel 26 and reinforcing ribs 28 to provide the optimum combination of strength and light weight.

At least one heap tracking roller 30 has a mounting assembly 32 at each end of roller 30 or set of rollers 30. Mounting assembly 32 includes a tube 34 slidably fitting over transverse rod 16. Tube 34 has a longitudinal slot 36 aligned with channel 26 through which cover 20 extends as shown in FIG. 4. Tube 34 is locked to transverse tube 16 by a pin 38 that extends through both tube and rod. Any other locking means, such as a bolt, roll pin, etc. may be used as desired.

A bracket 40 includes a sleeve 42 fitted around tube 34, a web 44 with a hole 46 for receiving and axle 48, typically an elongated bolt. Sleeve 42 may be secured to tube 34 by any conventional method such as adhesive bonding, welding or the like, or may be free to rotate relative to tube 34. Where sleeve 42 is not secured to tube 34, a strip 35 is preferably bonded to the outer surface of tube 34 to prevent sleeve from moving lengthwise along tube 34 while in use. Sleeve 42 is prevented from moving along tube 34 in the opposite direction by roller 30 secured to webs 44 at each end.

Sleeve 34 has a longitudinal cut out bounded by first wall 50 and second wall 52. Preferably, first and second walls 50 and 52 are oriented approximately 90° to each other, although arrangements of from about 70° to 110° could be used if desired. First wall 50 preferably lies approximately in the plane that encompasses the centerlines of transverse rod 16 and hole 46 and second wall 52 preferably lies approximately perpendicular to that plane.

In the embodiment of FIGS. 4–6, sleeve 42 is rotatable relative to tube 34. When cover 20 is being pulled to the deployed position, tubes 16 and 34 will rotate together until cover 20 lies against wall 52 and the assembly will be in the position shown in FIG. 1. When cover 20 is being rewound toward the storage position, the assembly will rotate until cover 20 engages wall 50, so that the assembly assumes a position with bracket 44 aligned with cover 20.

Operation of this cover system begins with cover rolled and stored in housing 54, (as seen in FIGS. 1 and 2) generally at the front or tractor end of trailer 10. At this time, the leading edge of cover 20 at transverse rod 16 is to the right of the position shown in FIG. 1, abutting housing 54. A rope 56 is secured to the leading edge 18 of cover 20 by a strap 57 of cover secured to transverse rod 16 is led over the back end of the trailer.

In the embodiment shown in FIG. 3, two spaced rollers 30 are provided with rope 56 passing between the rollers. A conventional bushing (not shown) is provided over transverse rod 16 between rollers 30 to keep the rollers slightly separated. If desired, a single roller 30 could be used with a bridle connecting rope 56 to the transverse rod beyond the ends of the roller.

As leading edge 18 moves toward heap 12, roller 30 encounters the heap and the resulting contact will rotate mounting assembly 32 to the upright position shown in FIG. 1, with the leading edge and transverse rod 16 well above the heap. Sheet 20 will lie along second wall 52 during this movement where sleeve 42 is rotatable relative to tube 34 and will be angled toward second wall 52 where sleeve 42 and tube 34 are bonded together in the relationship shown in FIG. 4.

Eventually, leading edge 18 with transverse rod 16 and roller will pass over the back end of trailer 10 and rope 56 will be tied to a cleat 58. Cover 20 will snugly engage heap 12 as seen in FIG. 2.

When it is desired to uncover the compartment, rope 56 will be released from cleat 58 and cover 20 will be wound up within housing either manually or by an electric motor or the like. As cover 20 moves back over heap 12, roller 30 will engage heap 12 and the resulting drag will cause the roller to trail, oriented as shown in FIG. 3.

With this heap climbing system, the cover leading edge will be raised well above heap 12 to prevent the leading edge from encountering the heap and undesirably transfer material to the top of the cover.

Figure 7:
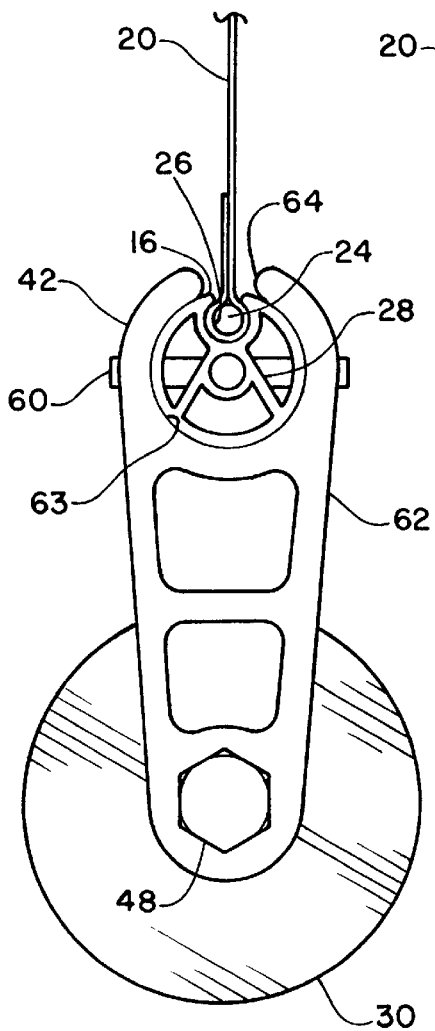
FIG. 7 is a side elevation view of an alternative bracket and transverse rod assembly.
Figure 8:
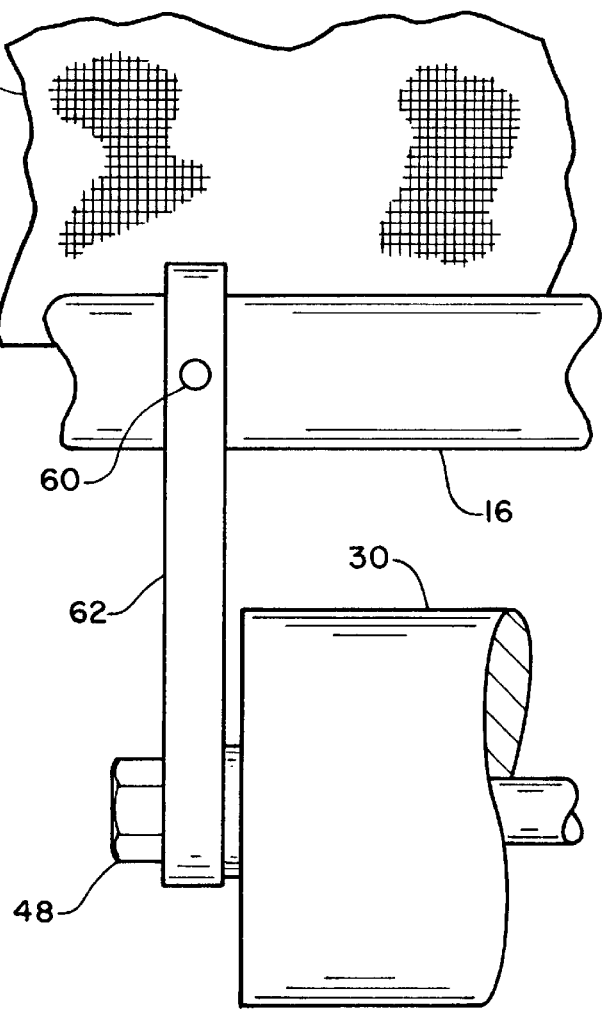
FIG. 8 is a front elevation view of the alternative assembly of FIG. 7.

An alternative embodiment of the heap climbing assembly is shown in FIGS. 7 and 8.

Here the assembly includes a flat bracket 62 having an opening at one end to receive axle 48 mounting roller 30 of the sort described above. The other end of bracket 62 has a transverse circular opening 63 for receiving transverse tube 16, configured as described above, with webs 28 and a circular cross section channel 26. A bead 24 is wrapped with an edge of cover 20 and slipped into channel 26 for retention in the channel.

A transverse slot 64 having rounded edges is formed in the end of bracket 62, intersecting opening 63 to form a sleeve for receiving tube 16. Slot 64 has a centerline lying in a plane that passes through the axes of roller 30 and tube 16.

A pin 60 passes through bracket 62 and tube 16 to lock the tube to the bracket with cover 20 extending out through the center of slot 64.

In operation, when the leading edge 18 of cover 20 is being pulled toward the deployed position as seen in FIG. 1, roller 30 will encounter a heap of material 12 and tend to rotate bracket 62 around tube 16 as an axis to the position shown in FIG. 1. I have found that with the cover connected at the end of bracket 62, the bracket will only rotate to the approximately vertical position seen in FIG. 1. Generally, the centerline of bracket between the centers of tube 16 and roller 30 will remain at an angle of about 60° to 120° to vertical to provide the desired lifting of the leading edge 18 of cover 20 above the heaped material 12.

When the cover is moved toward the storage position in housing 54, roller 30 will trail with the bracket centerline approximately parallel with cover 20.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A heap climbing container cover system, which comprises:

a roller;

a tube;

at least one bracket means for supporting said roller and tube in a substantially parallel relationship;

a cover having a leading edge for pulling over an open topped container;

connection means securing said leading edge to said tube; and means for pulling said leading edge along a heap of particulate material.

2. The heap climbing container cover system according to claim 1 wherein said leading edge includes a transverse bead and said tube includes a longitudinal slot configured to receive and retain said transverse bead therein.

3. The heap climbing container cover system according to claim 2 wherein said tube and roller each has a central axis and both of said central axes lie in a first plane, said tube is fixed to said bracket and said slot lies in said first plane.

4. The heap climbing container cover system according to claim 2 wherein said tube and roller each has a central axis and both of said central axes lie in a first plane and said tube is rotatable between a first position wherein said slot lies in said first plane and a second position wherein said slot lies in a plane through the slot and tube axis which is perpendicular to said first plane.

5. The heap climbing container cover system according to claim 4 wherein said bracket includes two radially spaced outwardly extending walls positioned around said tube to limit rotation of said tube to said first and second positions.

6. The heap climbing container cover system according to claim 1 further including a second said roller, and two said bracket means, each roller supported by one of said brackets at an outer roller end and said means for pulling said leading edge is a rope connected to said leading edge between said rollers.

7. A heap climbing container cover system, which comprises:

a sheet of flexible cover material having a leading edge for pulling over an open topped compartment;

a transverse tube having a central axis, said transverse tube secured to said leading edge;

a rope fastened to said leading edge for pulling said flexible cover over said open topped compartment;

at least one roller assembly which comprises:

an elongated roller having a central axis;

a bracket at each end of said roller, said roller secured to a distal end of each bracket for rotation relative thereto;

a partial circular sleeve secured to the proximal end of each bracket, said partially circular sleeve having an axis and having an elongated opening parallel to said axis for receiving said transverse tube;

said bracket having a centerline intersecting said sleeve and roller axes; and means for securing said cover leading edge to said tube within said elongated opening;

whereby when said rope is pulled to move said cover over said container and said roller contacts a load said bracket will rotate to a position with said centerline approximately perpendicular to a top of said compartment.

8. The heap climbing container cover system according to claim 7 wherein:

said partially circular sleeve opening extends approximately 270° around said transverse tube and has outwardly extending first and second walls bounding said partially circular opening;

said first wall extending generally in a plane in which said transverse tube and roller axes lie; and said second wall extending generally in a plane perpendicular to said plane in which said transverse tube and roller axes lie.

* * * * *